US010571620B2

(12) United States Patent
Chen et al.

(10) Patent No.: US 10,571,620 B2
(45) Date of Patent: Feb. 25, 2020

(54) PRISM FILM, LIGHT GUIDE PLATE, BACKLIGHT MODULE AND DISPLAY APPARATUS

(71) Applicants: BOE Technology Group Co., Ltd., Beijing (CN); BOE Optical Science and Technology Co., Ltd., Suzhou (CN)

(72) Inventors: Jialuo Chen, Beijing (CN); Gongguan Chen, Beijing (CN); Xiaoli Xie, Beijing (CN)

(73) Assignees: BOE TECHNOLOGY GROUP CO., LTD., Beijing (CN); BOE OPTICAL SCIENCE AND TECHNOLOGY CO., LTD, Suzhou (CN)

( * ) Notice: Subject to any disclaimer, the term of this patent is extended or adjusted under 35 U.S.C. 154(b) by 377 days.

(21) Appl. No.: 15/512,563

(22) PCT Filed: Aug. 19, 2016

(86) PCT No.: PCT/CN2016/095947
§ 371 (c)(1),
(2) Date: Mar. 19, 2017

(87) PCT Pub. No.: WO2017/118033
PCT Pub. Date: Jul. 13, 2017

(65) Prior Publication Data
US 2018/0196187 A1    Jul. 12, 2018

(30) Foreign Application Priority Data

Jan. 8, 2016    (CN) .......................... 2016 1 0012139

(51) Int. Cl.
*F21V 8/00* (2006.01)
*G02B 6/00* (2006.01)
*G02B 5/04* (2006.01)

(52) U.S. Cl.
CPC ............ *G02B 6/0053* (2013.01); *G02B 6/00* (2013.01); *G02B 6/0058* (2013.01); *G02B 6/0061* (2013.01); *G02B 5/045* (2013.01)

(58) Field of Classification Search
CPC ...... G02B 6/00; G02B 6/0053; G02B 6/0058; G02B 6/0061
See application file for complete search history.

(56) References Cited

U.S. PATENT DOCUMENTS

| 704,703 A | 7/1902 | Lippincott |
| 5,600,462 A | 2/1997 | Suzuki et al. |

(Continued)

FOREIGN PATENT DOCUMENTS

| CN | 1979290 A | 6/2007 |
| CN | 101300451 A | 11/2008 |

(Continued)

OTHER PUBLICATIONS

International Search Report and Written Opinion of International Application No. PCT/CN2016/095947, dated Nov. 14, 2016, 13 pages.

(Continued)

*Primary Examiner* — Thomas M Sember
(74) *Attorney, Agent, or Firm* — Westman, Champlin & Koehler, P.A.

(57) ABSTRACT

Embodiments of the present application provides a prism film, a light guide plate, a backlight module and a display apparatus. The prism film includes a sheet and an array of prisms arranged on a side of the sheet and vertex angles of the prisms in the array increase or decrease in magnitude sequentially from one end of the array of prisms to the other end of the array opposite to the one end.

20 Claims, 7 Drawing Sheets

(56) References Cited

U.S. PATENT DOCUMENTS

| | | | |
|---|---|---|---|
| 5,835,661 A | 11/1998 | Tai et al. | |
| 6,456,437 B1 | 9/2002 | Lea et al. | |
| 7,586,566 B2 | 9/2009 | Nelson et al. | |
| 8,436,960 B2 | 5/2013 | Teragawa | |
| 8,692,464 B2 | 4/2014 | Wang et al. | |
| 8,956,035 B2 | 2/2015 | Pan | |
| 9,201,269 B2 | 12/2015 | Huang | |
| 9,482,806 B2 | 11/2016 | Huang | |
| 9,500,905 B2 | 11/2016 | Ito | |
| 2004/0080948 A1 | 4/2004 | Subisak | |
| 2007/0030415 A1 | 2/2007 | Epstein | |
| 2007/0035940 A1 | 2/2007 | Yao et al. | |
| 2007/0064440 A1* | 3/2007 | Liao | G02B 6/0016 362/600 |
| 2012/0224111 A1 | 9/2012 | Ohshima | |

FOREIGN PATENT DOCUMENTS

| | | |
|---|---|---|
| CN | 101529280 A | 9/2009 |
| CN | 201302611 Y | 9/2009 |
| CN | 101189546 B | 5/2010 |
| CN | 202049253 U | 11/2011 |
| CN | 102565916 A | 7/2012 |
| CN | 102661544 A | 9/2012 |
| CN | 103149611 A | 6/2013 |
| CN | 102859272 B | 1/2014 |
| CN | 203909331 U | 10/2014 |
| CN | 104345376 A | 2/2015 |
| CN | 104364704 A | 2/2015 |
| CN | 104503011 A | 4/2015 |
| CN | 105445829 A | 3/2016 |
| TW | 200707012 A | 2/2007 |
| WO | 0042451 A1 | 7/2000 |
| WO | 2007043527 A1 | 4/2007 |

OTHER PUBLICATIONS

English translation of Box No. V of the Written Opinion for the International Searching Authority for International Application No. PCT/CN2016/095947, 2 pages.

Second Office Action from Chinese Patent Application No. 201610012139.7, dated Dec. 8, 2017, 15 pages.

First Office Action from Chinese Patent Application No. 201610012139.7, dated Jun. 14, 2017, 13 pages.

* cited by examiner

PRISM FILM, LIGHT GUIDE PLATE, BACKLIGHT MODULE AND DISPLAY APPARATUS

CROSS-REFERENCE TO RELATED APPLICATION

This application is a Section 371 National Stage Application of International Application No. PCT/CN2016/095947, filed on Aug. 19, 2016, which has not yet published, and claims priority to Chinese Patent Application No. 201610012139.7, entitled with "Prism Film, Light Guide Plate, Backlight Module And Display Apparatus", filed with SIPO on Jan. 8, 2016, which are incorporated herein by reference in their entirety.

BACKGROUND OF THE DISCLOSURE

Field of the Disclosure

The present disclosure relates to the technical field of display, and in particular, to a prism film, a light guide plate, a backlight module and a display apparatus.

Description of the Related Art

A side entrance type backlight module includes a light guide plate and a side entrance backlight light source arranged at a side of the light guide plate and a plurality of optical film layers such as a reflective layer below the light guide plate, a diffusion plate, a prism film above the light guide plate.

At present, a light guide plate is typically made of polymethyl methacrylate (PMMA) or polycarbonate (PC) material. These materials have different absorptivity to lights with different wavelengths. In particular, the absorptivity to the light with a short wavelength is greater than the absorptivity to the light with a long wavelength. And for the light with the same wavelength, the absorptivity of the light guide plate to the light is in positive proportion to a traveling distance of the light in the light guide plate.

Taking the PC material as an example, as illustrated in FIG. 1, the solid line in the figure represents the transmissivity of a 1 mm light guide plate to the light with different wavelengths and the dashed line represents the transmissivity of a 110 mm light guide plate to the light with different wavelengths. Seen from the figure, for the lights in different wavelength ranges, the difference in absorptivity of the light guide plate to them is smaller if they are transmitted through the light guide plate by a smaller thickness (1 mm); while the difference in absorptivity of the light guide plate to them is larger if they are transmitted through the light guide plate by a greater thickness (110 mm).

In particular, for the light guide plate, its exit light from the side close to a light source travels at a smaller distance in the light guide plate, thus, the difference in absorptivity of the light guide plate to the light with various wavelengths in spectrum is not great. And its exit light from the side away from the light source travels at a greater distance in the light guide plate, thus, the difference in absorptivity of the light guide plate to the light with various wavelengths in spectrum is very great. For example, the difference between the spectrum for the exit light from the side of the light guide plate away from the light source and the spectrum for the light emitted from the light source is greater than the difference between the spectrum for the exit light from the side of the light guide plate close to the light source and the spectrum for the light emitted from the light source. In the exit light from the side of the light guide plate away from the light source, the proportion of the light with long wavelengths is higher while the proportion of the light with short wavelengths is lower. Thus, on the side of the light guide plate away from the light source, the exit light exhibits a yellowish color. In this way, there is a significant chromatic aberration in the exit lights emitted from different areas of the light guide plate, such that the chromatic aberration occurs in the exit lights emitted from the backlight module. Thus, in a display apparatus including the backlight module, uniformity in display becomes poor.

SUMMARY

The present application is intended to at least alleviate one of the technical problems in the prior art, provides a prism film, a light guide plate, a backlight module and a display apparatus.

In order to achieve the object of the present application, a prism film is provided including a sheet and an array of prisms arranged on a side of the sheet, wherein vertex angles of the prisms in the array increase or decrease in magnitude sequentially from one end of the array of prisms to the other end of the array opposite to the one end.

In an embodiment, the magnitudes of the vertex angles of the prisms in the array have a minimum value of 90 degrees.

In an embodiment, the magnitudes of the vertex angles of the prisms in the array have a maximum value of 180 degrees.

In an embodiment, the prisms are triangular prisms.

In an embodiment, a projection of side faces of the prisms onto the sheet is in a form of a straight line, a fold line or a curved line.

In an embodiment, the sheet is made of polyethylene terephthalate.

As an alternative, the present application also provides a light guide plate, including a light guide layer and an array of prisms arranged on a side of the light guide layer, wherein vertex angles of the prisms in the array increase or decrease in magnitude sequentially from one end of the array of prisms to the other end of the array opposite to the one end.

In an embodiment, the magnitudes of the vertex angles of the prisms in the array have a minimum value of 90 degrees and a maximum value of 180 degrees.

In an embodiment, the prisms are triangular prisms; and a projection of side faces of the prisms onto the light guide layer is in a form of a straight line, a fold line or a curved line.

The present application also provides a backlight module, including the prism film provided by the present application, a light guide plate and a side entrance light source; wherein the side of the prism film on which a column of prisms having a minimum magnitude of the vertex angles of the prisms are arranged is adjacent to the side entrance light source.

The present application also provides another backlight module, including the prism film provided by the present application and a side entrance light source; wherein the side of the light guide plate on which a column of prisms having a minimum magnitude of the vertex angles of the prisms in the array are arranged is adjacent to the side entrance light source.

The present application also provides a display apparatus, including the backlight module provided by the present application.

BRIEF DESCRIPTION OF THE DRAWINGS

The drawings are intended to further illustrate the present application and form a part of the description. They are used to explain the present application in combination with the following embodiments, instead of limiting the present application. In the drawings.

DETAILED DESCRIPTION OF PREFERRED EMBODIMENTS OF THE DISCLOSURE

The embodiments of the present application will be further explained below with reference to drawings. It should be understood that the described embodiments are only intended to describe and explain the present application, instead of limiting the present application.

Figure 1:
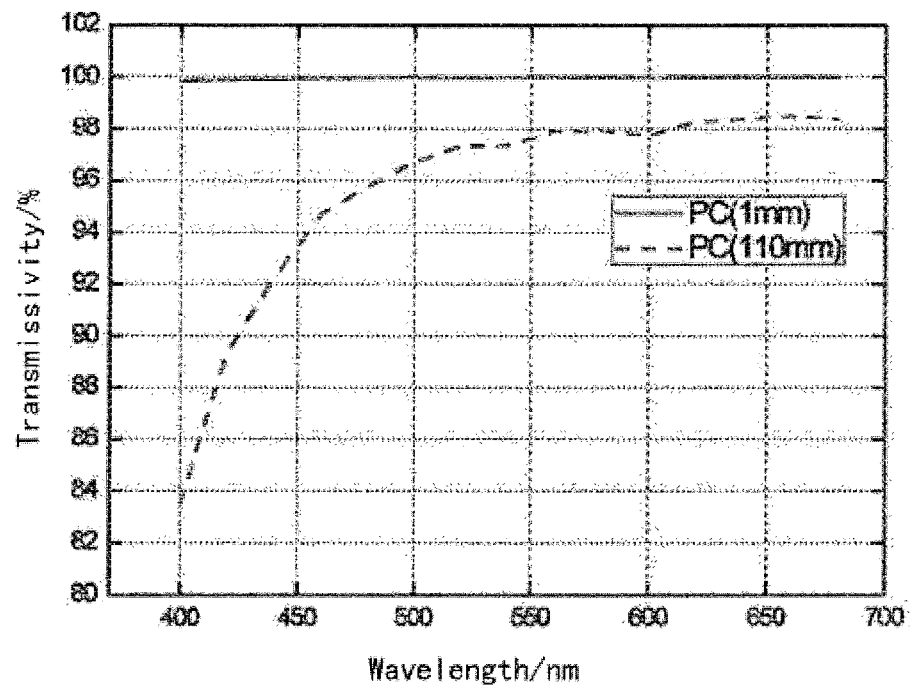
FIG. 1 is a schematic view showing transmissivity of the light guide plate to lights with different wavelengths traveling in the light guide plate.
Figure 2:
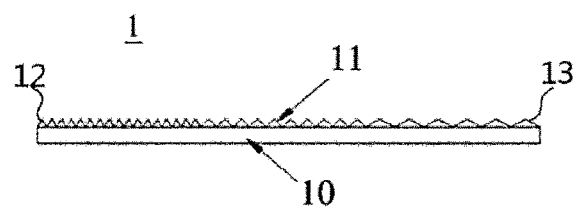
FIG. 2 is a schematic view showing a structure of a prism film in accordance with an embodiment of the present application.

An embodiment of the present application provides a prism film. FIG. 2 is a schematic view showing a structure of the prism film in an embodiment of the present application. As shown in FIG. 2, in the embodiment, the prism film 1 includes a sheet 10 and an array of prisms 11 arranged on a side of the sheet 10. As an example, the sheet 10 may be made of polyethylene terephthalate (PET). The prisms 11 may be triangular prisms.

In the embodiment, vertex angles of the prisms 11 in the array increase or decrease in magnitude sequentially. As an example shown in FIG. 2, vertex angles of the prisms 11 in the array increase in magnitude sequentially from the left to the right (i.e., from a first end 12 of the array of prisms to a second end 13 of the array opposite to the first end). In an example, the magnitudes of the vertex angles of the prisms in the array may have a minimum value of 90 degrees. The magnitudes of the vertex angles of the prisms in the array may have a maximum value of 180 degrees. The magnitude of 180 degrees of the vertex angles of the prisms means the surface at the prisms is planar. Further, alternatively, the maximum value of the magnitudes of the vertex angles of the prisms may be an obtuse angle less than 180 degrees.

As known, dispersion may occur when a light with a spectrum is refracted in a prism and may depend on an incident angle of the light on the prism. In an embodiment, the vertex angles of the prisms 11 in the array have different magnitudes such that the light traveling in a same direction has different incident angles on the different prisms 11. In this way, degrees of the dispersion may become different when the light passes through the array of prisms 11. When the prism film 1 provided by the embodiment is used in a backlight module, the chromatic aberration in the light exiting from the light guide plate may be compensated by means of the dispersion of the array of prisms 11 such that the chromatic aberration in the light exiting from the light guide plate and having been transmitted through the prism film can be reduced, so as to improve the uniformity in the light exiting from the backlight module.

The advantageous effects of the prism film provided by the embodiments of the present application on the chromatic aberration in the exit light of the light guide plate will be verified by experiments below.

In an example, two backlight modules are selected. The first backlight module uses the conventional prism film in which the vertex angles of prisms in the array have magnitudes of 90 degrees. The second backlight module uses the prism film provided by the embodiment of the present application in which the magnitudes of the vertex angles of the prisms in the array may have a minimum value of 90 degrees and a maximum value of 120 degrees. The side of the prism film on which the prisms with the magnitudes of the vertex angles of 90 degrees are arranged is adjacent to a light source of the backlight module. The first backlight module and the second backlight module have same components other than the prism film.

Figure 3:
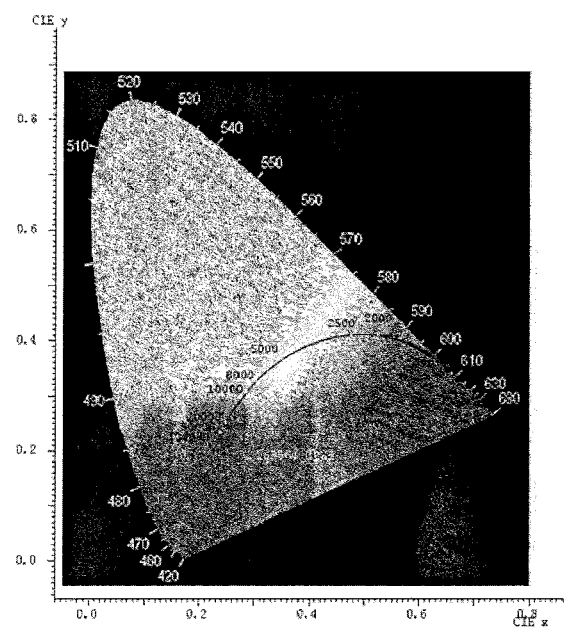
FIG. 3 is a CIE chromatic diagram showing color coordinates of point A.
Figure 4:
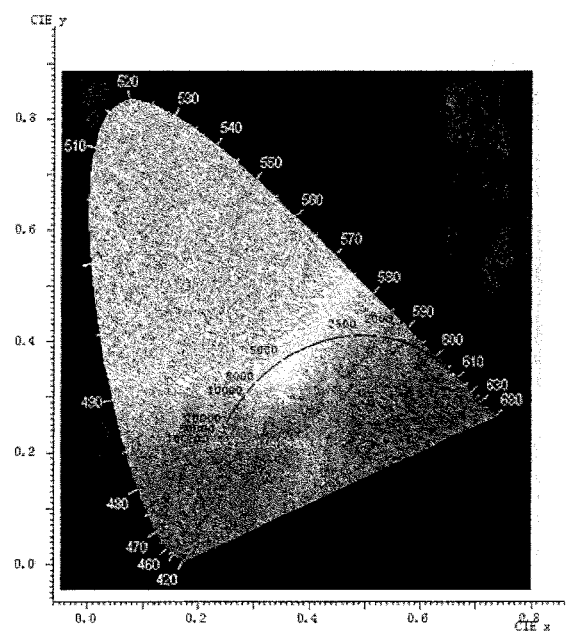
FIG. 4 is a CIE chromatic diagram showing color coordinates of point B.

A point is selected on the side of a light exit face of the first backlight module close to the light source, as point A. The spectrum color coordinates of the light exiting from the point A are detected and represented in a CIE chromatic diagram. As illustrated in FIG. 3, the color coordinates are $x=0.276$, $y=0.267$. A point is selected on the side of a light exit face of the first backlight module away from the light source, as point B. The spectrum color coordinates of the light exiting from the point B are detected and represented in a CIE chromatic diagram. As illustrated in FIG. 4, the color coordinates are $x=0.289$, $y=0.291$. Thus, the chromatic aberration between the point A and the point B is $x=0.013$, $y=0.022$.

Figure 5:
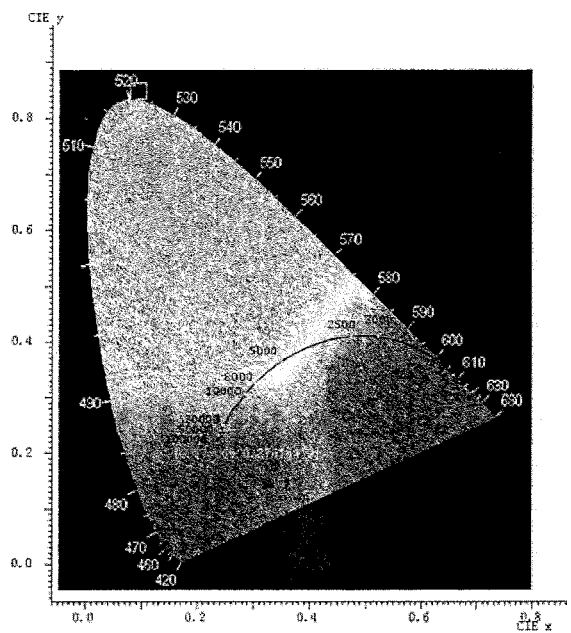
FIG. 5 is a CIE chromatic diagram showing color coordinates of point A'.
Figure 6:
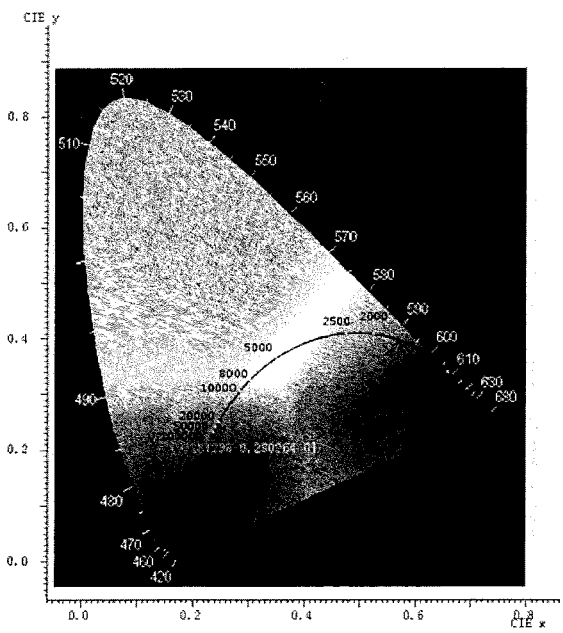
FIG. 6 is a CIE chromatic diagram showing color coordinates of point B'.

A point is selected on the side of a light exit face of the second backlight module close to the light source, as point A'. The point A' has the same position as that of the point A. The spectrum color coordinates of the light exiting from the point A' are detected and represented in a CIE chromatic diagram. As illustrated in FIG. 5, the color coordinates are $x=0.278$, $y=0.276$. A point is selected on the side of the light exit face of the second backlight module away from the light source, as point B'. The point B' has the same position as that of the point B. The spectrum color coordinates of the light exiting from the point B' are detected and represented in a CIE chromatic diagram. As illustrated in FIG. 6, the color coordinates are $x=0.281$, $y=0.280$. Thus, the chromatic aberration between the point A' and the point B' is $x=0.003$, $y=0.004$.

By the above comparison, it may be determined that the chromatic aberration between the point A' and the point B' in the second backlight module is significantly smaller than the chromatic aberration between the point A and the point B in the first backlight module. It means that the prism film provided by the embodiment of the present application can improve the chromatic aberration of the exit light of the light guide plate significantly.

Figure 7:
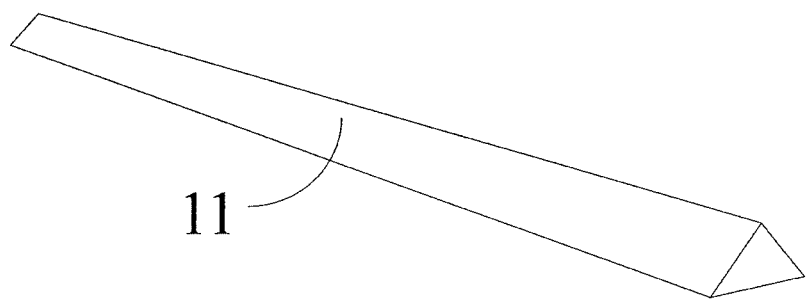
FIG. 7 is a schematic view showing a first structure of the prisms in the prism film shown in FIG. 2.

In the embodiment, as required, a projection of side faces of the prisms 11 onto the sheet 10 is in a form of a straight line, a fold line or a curved line. That is, the array of prisms 11 may be in any form of those shown in FIG. 7, shown in FIG. 8 and shown in FIG. 9.

In the prism film provided by the embodiment of the present application, the vertex angles of the prisms 11 in the array increase or decrease in magnitude sequentially. In this way, the dispersion will become different or various when the exit light of the light guide plate passes through the prism film, so as to compensate for the chromatic aberration of the exit light of the light guide plate to reduce the chromatic aberration of the exit light from the prism film and improve uniformity.

Figure 10:
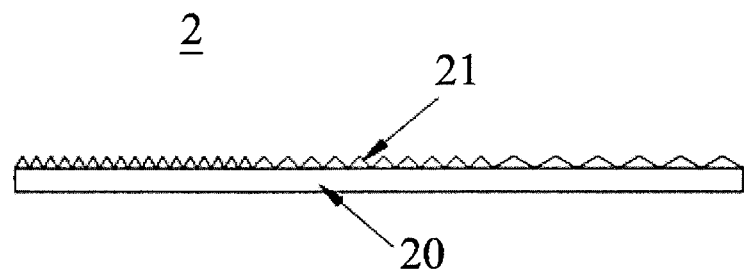
FIG. 10 is a schematic view showing a structure of the light guide plate provided by the present application.

The present application also provides a light guide plate and gives its embodiments. As shown in FIG. 10, in the embodiment of the present application, the light guide plate 2 includes a light guide layer 20 and an array of prisms 21 arranged on a side of the light guide layer 20. The vertex angles of the prisms 21 in the array increase or decrease in magnitude sequentially.

As an example shown in FIG. 10, vertex angles of the prisms 21 in the array increase in magnitude sequentially from the left to the right. In an example, the magnitudes of the vertex angles of the prisms 21 in the array may have a minimum value of 90 degrees. The magnitudes of the vertex angles of the prisms 21 in the array may have a maximum value of 180 degrees. The magnitude of 180 degrees of the vertex angles of the prisms means the surface at the prisms is planar. Further, alternatively, the maximum value of the magnitudes of the vertex angles of the prisms may be an obtuse angle less than 180 degrees.

As known, a dispersion effect may occur when a light with a spectrum is refracted in a prism and may depend on an incident angle of the light on the prism. In an embodiment, the vertex angles of the prisms 21 in the array have different magnitudes such that the light traveling in a same direction has different incident angles on the different prisms 21 in the array. In this way, degrees of the dispersion may become different when the light passes through the array of prisms 21. When the light guide plate 2 provided by the embodiment is used in a backlight module, the chromatic aberration in the light exiting from the light guide layer 20 may be compensated by means of the dispersion of the array of prisms 21 such that the chromatic aberration in the light exiting from the light guide layer 20 and having been transmitted through the array of prisms 21 can be reduced, so as to improve the uniformity in the light exiting from the backlight module.

Figure 8:
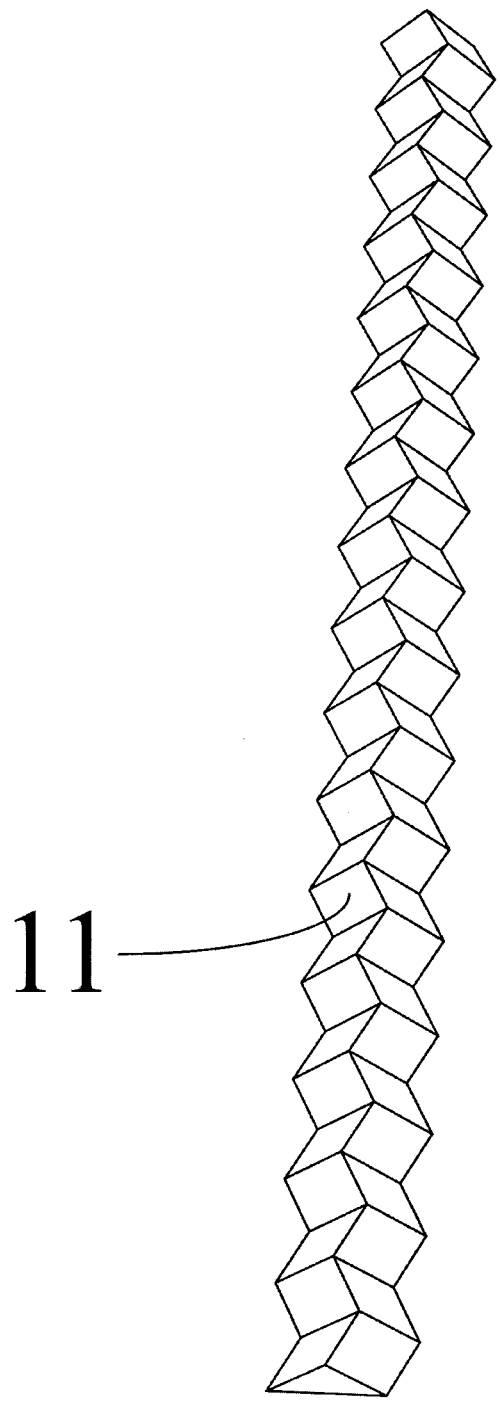
FIG. 8 is a schematic view showing a second structure of the prisms in the prism film shown in FIG. 2.
Figure 9:
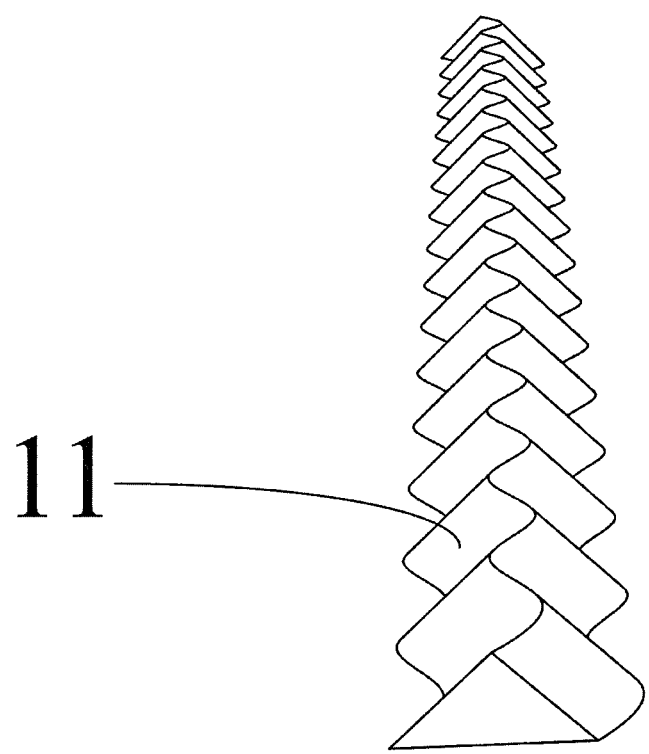
FIG. 9 is a schematic view showing a third structure of the prisms in the prism film shown in FIG. 2.

In the embodiment, the prisms 21 are triangular prisms; and a projection of side faces of the prisms 21 onto the light guide layer 20 is in a form of a straight line, a fold line or a curved line, that is, the prisms 21 shown have the same shapes as those of the prisms 11 shown in FIGS. 7 to 9.

In the light guide plate 2 provided by the embodiment of the present application, the vertex angles of the prisms 21 in the array increase or decrease in magnitude sequentially. In this way, the dispersion will become different or various when the exit light of the light guide layer 20 passes through the array of prisms 21, so as to compensate for the chromatic aberration of the exit light of the light guide layer 20 to reduce the chromatic aberration of the exit light from the light guide plate 2 and improve uniformity thereof.

Figure 11:
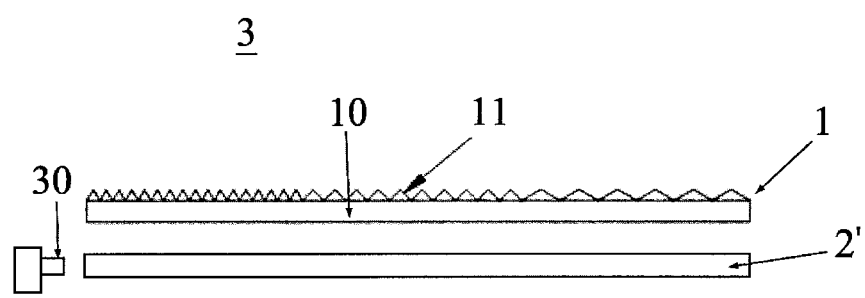
FIG. 11 is a schematic view showing a first backlight module provided by the present application.

The present application also provides an embodiment of a backlight module. In the embodiment, as shown in FIG. 11, the backlight module 3 includes the prism film 1 as described in any one of the above embodiments, a light guide plate 2'(same to or similar to the light guide plate in the prior art) and a side entrance light source 30. The side of the prism film 1 on which a column of prisms 11 having a minimum magnitude of the vertex angles of the prisms are arranged is adjacent to the side entrance light source 30.

As described in above background section of disclosure, the difference between the spectrum for the exit light from the side of the light guide plate 2 away from the light source 30 and the spectrum for the light emitted from the light source is greater than the difference between the spectrum for the exit light from the side of the light guide plate 2 close to the light source 30 and the spectrum for the light emitted from the light source. In the exit light from the side of the light guide plate 2 away from the light source 30, the proportion of the light with long wavelengths is higher while the proportion of the light with short wavelengths is lower. Thus, on the side of the light guide plate 2 away from the light source, the exit light exhibits a yellowish color.

In the embodiment, the side of the light guide plate 2 close to the light source 30 corresponds to the prisms 11 with smaller magnitudes of the vertex angles while the side of the light guide plate 2 away from the light source 30 corresponds to the prisms 11 with greater magnitudes of the vertex angles. It may compensate for the yellowish exit light from the side of the light guide plate 2 away from the light source 30, so as to reduce the chromatic aberration of the exit light of the backlight module 3 and to improve uniformity in the exit light of the backlight module 3.

In the backlight module provided by the embodiment of the present application, the prism film provided by the embodiment of the present application is used. In this way, the dispersion will become various or different when the exit light of the light guide plate passes through the prism film, so as to compensate for the chromatic aberration of the exit light of the light guide plate to reduce the chromatic aberration of the exit light from the backlight module and improve uniformity.

Figure 12:
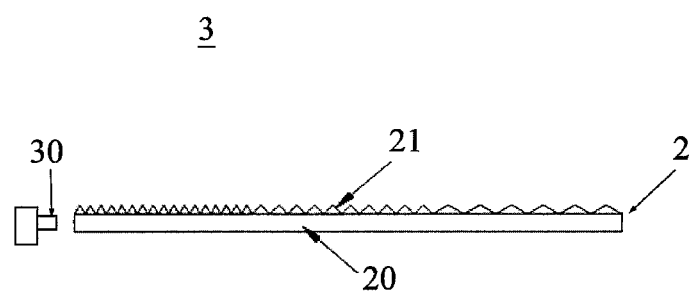
FIG. 12 is a schematic view showing a second backlight module provided by the present application.

The present application also provides another embodiment of the backlight module. In the embodiment, as shown in FIG. 12, the backlight module 3 includes the light guide plate 2 described in any one of the above embodiments and a side entrance light source 30. The side of the light guide plate 2 on which a column of prisms 21 having a minimum magnitude of the vertex angles of the prisms 21 in the array are arranged is adjacent to the side entrance light source 30.

Similar to the above first backlight module, in the embodiment, the side of the light guide layer 20 close to the light source 30 corresponds to the prisms 21 with smaller magnitudes of the vertex angles while the side of the light guide layer 20 away from the light source 30 corresponds to the prisms 21 with greater magnitudes of the vertex angles. It may compensate for the yellowish exit light from the side of the light guide layer 20 away from the light source 30, so as to reduce the chromatic aberration of the exit light of the backlight module 3 and to improve uniformity in the exit light of the backlight module 3.

The present application also provides a display apparatus. In the embodiment of the display apparatus, the display apparatus includes the above backlight module provided by the present application.

In the display apparatus provided by the embodiment of the present application, the backlight module provided by the embodiment of the present application is used. In this way, uniformity of the exit light of the display apparatus may be improved to improve uniformity in display.

It should be noted that the above embodiments are only exemplary embodiments for explaining principles of the present application, however, the present application is not limited by this. The skilled person in the art may make various modifications and improvements without departing from the scope and spirit of the present disclosure. These modifications and improvements shall fall within the scope of the present application.

What is claimed is:

1. A prism film comprising a sheet and an array of prisms arranged on a side of the sheet perpendicular to a thickness direction of the sheet, wherein vertex angles of the prisms in the array increase or decrease in magnitude sequentially from one end of the array of prisms to the other end of the array opposite to the one end.

2. The prism film according to claim 1, wherein the magnitudes of the vertex angles of the prisms in the array have a minimum value of 90 degrees.

3. The prism film according to claim 2, wherein the magnitudes of the vertex angles of the prisms in the array have a maximum value of 180 degrees.

4. The prism film according to claim 3, wherein the prisms are triangular prisms, and a projection of side faces of the prisms onto the sheet is in a form of a straight line, a fold line or a curved line.

5. The prism film according to claim 4, wherein the sheet is made of polyethylene terephthalate.

6. The prism film according to claim 1, wherein the magnitudes of the vertex angles of the prisms in the array have a maximum value of 180 degrees.

7. The prism film according to claim 1, wherein the prisms are triangular prisms.

8. The prism film according to claim 7, wherein a projection of side faces of the prisms onto the sheet is in a form of a straight line, a fold line or a curved line.

9. The prism film according to claim 1, wherein the sheet is made of polyethylene terephthalate.

10. A backlight module, comprising the prism film according to claim 1, a light guide plate and a side entrance light source; wherein the side of the prism film on which a column of prisms having a minimum magnitude of the vertex angles of the prisms are arranged is adjacent to the side entrance light source.

11. A display apparatus, comprising the backlight module according to claim 10.

12. The backlight module according to claim 10, wherein the magnitudes of the vertex angles of the prisms in the array have a minimum value of 90 degrees and a maximum value of 180 degrees.

13. The backlight module according to claim 10, wherein the prisms are triangular prisms; and a projection of side faces of the prisms onto the light guide layer is in a form of a straight line, a fold line or a curved line.

14. A light guide plate, comprising a light guide layer and an array of prisms arranged on a side of the light guide layer perpendicular to a thickness direction of the light guide layer, wherein vertex angles of the prisms in the array increase or decrease in magnitude sequentially from one end of the array of prisms to the other end of the array opposite to the one end.

15. The light guide plate according to claim 14, wherein the magnitudes of the vertex angles of the prisms in the array have a minimum value of 90 degrees and a maximum value of 180 degrees.

16. The light guide plate according to claim 14, wherein the prisms are triangular prisms; and a projection of side faces of the prisms onto the light guide layer is in a form of a straight line, a fold line or a curved line.

17. A backlight module, comprising the light guide plate according to claim 14 and a side entrance light source; wherein the side of the light guide plate on which a column of prisms having a minimum magnitude of the vertex angles of the prisms in the array are arranged is adjacent to the side entrance light source.

18. The backlight module according to claim 17, wherein the magnitudes of the vertex angles of the prisms in the array have a minimum value of 90 degrees and a maximum value of 180 degrees.

19. The backlight module according to claim 17, wherein the prisms are triangular prisms; and a projection of side faces of the prisms onto the light guide layer is in a form of a straight line, a fold line or a curved line.

20. A display apparatus, comprising the backlight module according to claim 17.

* * * * *